US012603926B2

(12) United States Patent
Chen

(10) Patent No.: US 12,603,926 B2
(45) Date of Patent: Apr. 14, 2026

(54) METHOD, SYSTEM, STORAGE MEDIUM FOR COMMUNICATION SESSION

(71) Applicant: Jun Chen, Changsha (CN)

(72) Inventor: Jun Chen, Changsha (CN)

( * ) Notice: Subject to any disclaimer, the term of this patent is extended or adjusted under 35 U.S.C. 154(b) by 19 days.

(21) Appl. No.: 18/903,711

(22) Filed: Oct. 1, 2024

(65) Prior Publication Data

US 2025/0220058 A1     Jul. 3, 2025

(30) Foreign Application Priority Data

Dec. 31, 2023   (CN) .......................... 202311860837.9

(51) Int. Cl.
| | |
|---|---|
| *H04L 65/1069* | (2022.01) |
| *G06Q 30/00* | (2023.01) |
| *G06Q 50/50* | (2024.01) |
| *H04L 9/14* | (2006.01) |
| *H04L 65/1073* | (2022.01) |
| *H04L 67/1074* | (2022.01) |

(52) U.S. Cl.
CPC ......... *H04L 65/1073* (2013.01); *G06Q 50/50* (2024.01); *H04L 65/1069* (2013.01); *G06Q 2220/00* (2013.01)

(58) Field of Classification Search
CPC ....... H04L 9/3247; H04L 9/50; H04L 9/3239; H04W 12/06; H04W 12/08; H04W 48/08; G06F 21/31; G06Q 20/401
USPC .......................................................... 705/44
See application file for complete search history.

(56) References Cited

U.S. PATENT DOCUMENTS

| | | | | |
|---|---|---|---|---|
| 2014/0278978 A1* | 9/2014 | O'Connor | .......... | G06Q 30/0255 |
| | | | | 705/14.53 |
| 2019/0034459 A1* | 1/2019 | Qiu | ..................... | H04L 63/0869 |
| 2020/0043000 A1* | 2/2020 | Unagami | .............. | H04L 9/3247 |
| 2020/0145198 A1* | 5/2020 | Guan | ..................... | H04L 9/30 |
| 2020/0320518 A1* | 10/2020 | Simas | ................... | H04L 9/3247 |
| 2021/0006555 A1* | 1/2021 | Honjo | ................... | H04L 9/3268 |
| 2021/0037013 A1* | 2/2021 | Salkintzis | ............. | H04W 12/04 |
| 2021/0105142 A1* | 4/2021 | Lee | .......................... | G06F 21/31 |

(Continued)

FOREIGN PATENT DOCUMENTS

| | | |
|---|---|---|
| CN | 1957578 A | 5/2007 |
| CN | 104321798 A | 1/2015 |
| CN | 105306430 A | 2/2016 |

*Primary Examiner* — Marcus Smith
*Assistant Examiner* — Jason A Harley

(57) ABSTRACT

The present application discloses a method, system and storage medium for a communication session, involving blockchain technology. The present application sends a session request message based on a first terminal blockchain address session state, where the session request message includes a session request message identifier, a first terminal session account, and the first terminal session account includes: the first terminal blockchain address or an address mapped one-in-one to the first terminal blockchain address, and a first terminal home server connection address, the first terminal blockchain address session state is determined based on a transaction record between a visiting server blockchain address and the first terminal blockchain address; receives a session response message corresponding to the session request message identifier. By means of the present application, the visiting server can provide connection communication service for any blockchain user, which improves the convenience of terminal communication.

16 Claims, 4 Drawing Sheets

(56)　　　　References Cited

U.S. PATENT DOCUMENTS

| | | | |
|---|---|---|---|
| 2021/0351940 A1* | 11/2021 | Aschauer | H04L 9/3239 |
| 2021/0377281 A1* | 12/2021 | Wang | H04L 61/4511 |
| 2022/0052855 A1* | 2/2022 | He | H04L 63/126 |
| 2022/0198441 A1* | 6/2022 | Dalton | G06Q 20/227 |
| 2023/0188368 A1* | 6/2023 | Bertin | H04L 9/50 |
| | | | 713/168 |
| 2023/0216947 A1* | 7/2023 | Bernardi | H04L 67/10 |
| | | | 713/150 |
| 2024/0097912 A1* | 3/2024 | Gould | H04L 9/3236 |
| 2025/0086600 A1* | 3/2025 | Song | H04L 9/50 |

* cited by examiner

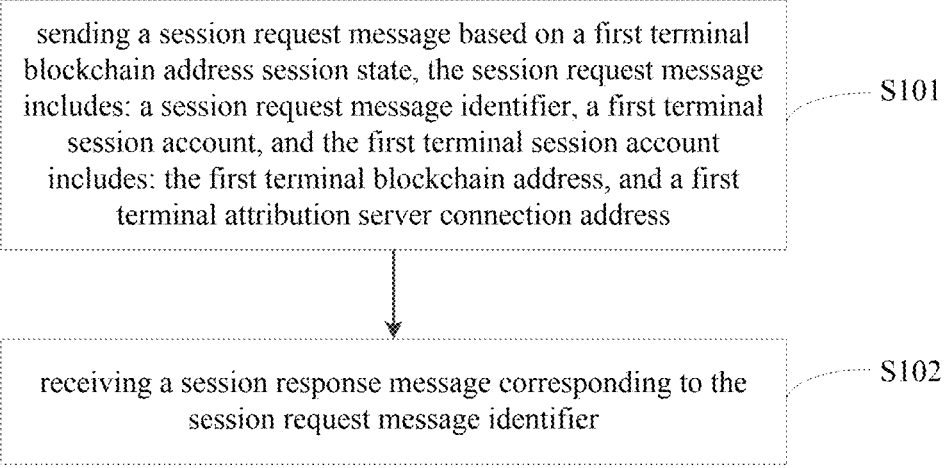

sending a session request message based on a first terminal blockchain address session state, the session request message includes: a session request message identifier, a first terminal session account, and the first terminal session account includes: the first terminal blockchain address, and a first terminal attribution server connection address ⸺ S101 receiving a session response message corresponding to the session request message identifier ⸺ S102

FIG. 7

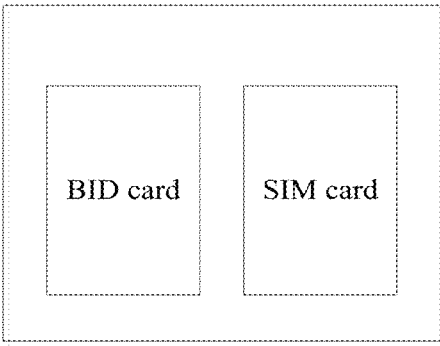

BID card    SIM card

FIG. 8

METHOD, SYSTEM, STORAGE MEDIUM FOR COMMUNICATION SESSION

CROSS-REFERENCE TO RELATED APPLICATIONS

The present application claims priority to Chinese Patent Application No. 202311860837.9, filed Dec. 31, 2023, the entire disclosure of which is incorporated herein by reference.

TECHNICAL FIELD

The present application relates to the field of blockchain technology, and in particular to a method and a system for a communication session.

BACKGROUND

Existing technologies already enable identifier of IoT endpoints using Blockchain-based ID (BID) technology, and sending and receiving messages using blockchain email technology. In addition, the Session Initiation Protocol (SIP), after decades of robust development, is becoming increasingly active in all types of in-use communication systems.

SUMMARY

The inventor found that although the existing SIP communication network is open, the SIP communication networks cannot interconnect with each other, there are many user systems, and the terminal cannot connect with any SIP server. In addition, various types of private communication networks are mostly closed, not open communication networks, relying on proprietary physical connections to ensure their security and reliability. SIP terminals roaming from one internal communication system to another internal communication system cannot use communication services without realizing registration. The blockchain system can provide a unified identity authentication system and a real-time payment system, and the terminals using BID technology are eager to interconnect with the communication network through flexible network routing, so it is urgent to build a unified blockchain communication system.

In order to overcome the shortcomings of the independent communication system in the related art in which the terminals cannot interconnect with the communication server of the private network, and to enhance the convenience of the user. The present application provides a method and system for a communication session for solving the above problems in the background technology.

To achieve the above purpose, the present application is realized by the following technical solution: a method for a communication session includes:

sending a session request message based on a first terminal blockchain address session state, the session request message includes a session request message identifier, a first terminal session account, and the first terminal session account includes the first terminal blockchain address or an address mapped one-in-one to the first terminal blockchain address, and a first terminal home server connection address, the first terminal blockchain address session state is determined based on a transaction record between a visiting server blockchain address and the first terminal blockchain address; and receiving a session response message corresponding to the session request message identifier.

In one embodiment, the session request message further includes: a session request message signature, and the session request message signature is a blockchain signature message generated based on the first terminal blockchain address and the session request message identifier.

In one embodiment, the session state includes at least one of: a connectable state, a non-connectable state, a connectable duration, and a connectable type.

In one embodiment, before sending the session request message based on the first terminal blockchain address session state, the method further includes:

obtaining a first terminal blockchain address, a first terminal home server connection address; and determining a first terminal session account.

In one embodiment, before sending the session request message based on the first terminal blockchain address session state, the method further includes: obtaining the first terminal blockchain address, the first terminal home server connection address from a blockchain identification card; and determining the first terminal session account.

In one embodiment, before sending the session request message based on the first terminal blockchain address session state, the method further includes: obtaining a second terminal blockchain address, a second terminal home server connection address, and determining a second terminal session account;

the session request message includes: the second terminal session account.

In one embodiment, before sending the session request message based on the first terminal blockchain address session state, the method further includes: obtaining a second terminal blockchain address, a second terminal home server connection address from a payment file, and determining a second terminal session account.

In one embodiment, determining the first terminal blockchain address session state based on the transaction record between the visiting server blockchain address and the first terminal blockchain address includes: the first terminal blockchain address session state is determined based on a recent transaction record initiated by the visiting server blockchain address to the first terminal blockchain address.

In one embodiment, before sending the session request message based on the first terminal blockchain address session state, the method further includes: sending a session fee or a session score from the first terminal blockchain address to the visiting server blockchain address.

In one embodiment, the session request message includes one of: a SIP protocol register request message, a SIP protocol invite request message, and a SIP protocol message request message.

In one embodiment, before sending the session request message based on the first terminal blockchain address session state, the method further includes: determining the first terminal session account based on the first terminal blockchain email address.

In one embodiment, before sending the session request message based on the first terminal blockchain address session state, the method further includes: determining the second terminal session account based on a second terminal blockchain email address.

In one embodiment, before sending the session request message based on the first terminal blockchain address session state, the method further includes: determining the visiting server session account based on the visiting server blockchain email address, and sending the session request message to the visiting server session account based on the first terminal blockchain address session state.

In one embodiment, before sending the session request message based on the first terminal blockchain address session state, the method further includes: sending the session request message to the first terminal home server connection address based on the first terminal blockchain address session state.

In one embodiment, the first terminal home server connection address is a current level domain address or an IP address or an upper level domain address contained in a suffix of the first terminal blockchain email address.

In another aspect, a method for a communication session includes:

receiving a session request message, the session request message includes: a session request message identifier, a first terminal session account, and the first terminal session account includes: a first terminal blockchain address or an address mapped one-in-one to the first terminal blockchain address, and a first terminal home server connection address;

determining a first terminal blockchain address session state based on a transaction record between a visiting server blockchain address and the first terminal blockchain address; and sending a session response based on the first terminal blockchain address session state and the session request message.

In one embodiment, the method further includes:

the session request message further includes: a session request message signature, and the session request message signature is a blockchain signature message generated based on the first terminal blockchain address and the session request message identifier; and verifying whether the session request message signature is a blockchain signature of the first terminal blockchain address based on the first terminal blockchain address, the session request message identifier, and the session request message signature.

In one embodiment, the session state includes at least one of: a connectable state, a non-connectable state, a connectable duration, and a connectable type.

In one embodiment, the session request message includes one of: a SIP protocol register request message, a SIP protocol invite request message, and a SIP protocol message request message.

In one embodiment, the first terminal session account includes a first terminal blockchain email address.

In one embodiment, determining the first terminal blockchain address session state based on the transaction record between the visiting server blockchain address and the first terminal blockchain address includes:

the first terminal home server connection address is a current level domain address or an IP address or an upper level domain address contained in a suffix of the first terminal blockchain email address;

in response to that the blockchain network corresponding to the first terminal home server connection address is supported, determining the first terminal blockchain address session state based on the transaction record between the visiting server blockchain address and the first terminal blockchain address;

in response to that the blockchain network corresponding to the first terminal home server connection address is not supported, forwarding the session request message to the first terminal home server connection address to enable the first terminal home server connection address to determine the first terminal blockchain address session state based on the transaction record between the first terminal home server blockchain address and the first terminal blockchain address, and receiving an home server session response sent by the first terminal home server connection address based on the first terminal blockchain address session state and the session request message.

In one embodiment, the blockchain network corresponding to the first terminal home server connection address includes: a blockchain network corresponding to the first terminal home server connection address and a blockchain network corresponding to the upper level domain name of the first terminal home server connection address.

In one embodiment, determining the first terminal blockchain address session state based on a transaction record between a visiting server blockchain address and the first terminal blockchain address includes:

determining the first terminal blockchain address session state based on the recent transaction record initiated by the visiting server blockchain address to the first terminal blockchain address.

In one embodiment, the determining the first terminal blockchain address session state based on the transaction record between the visiting server blockchain address and the first terminal blockchain address includes:

querying the transaction record between the visiting server blockchain address and the first terminal blockchain address, the transaction record nestedly includes inscription information; and determining the first terminal blockchain address session state based on the inscription information.

In one embodiment, the method further includes:

the session request message includes: a SIP protocol register request message; and adding the first terminal to a user table.

In one embodiment, the method further includes:

the session request message includes a SIP protocol invite request message, and the session request message includes a second terminal session account; and forwarding the session request message to the second terminal session account.

In one embodiment, the second terminal session account includes a second terminal blockchain email address.

In one embodiment, the method further includes:

the session request message includes: a second terminal session account;

determining a second terminal home server connection address, the second terminal home server connection address is a current level domain address or an IP address or an upper level domain address contained in the suffix of the second terminal blockchain email address; and forwarding the session request message to the second terminal home server connection address.

In one embodiment, the method further includes:

obtaining a list of forwarding addresses; and forwarding the session request message to the list of forwarding addresses one by one.

In another aspect, a system for a communication session for a first terminal device, the first terminal device includes: a transmission unit, a receiving unit; the transmission unit and the receiving unit are logically connected to each other;

the transmission unit, for sending a session request message based on a first terminal blockchain address session state, the session request message includes: a session request message identifier, a first terminal session account, and the first terminal session account includes: the first terminal blockchain address or an address mapped one-in-one to the first terminal blockchain address, and a first terminal home server connection address, the first terminal blockchain address session state is determined based on a transaction record between a visiting server blockchain address and the first terminal blockchain address; and the receiving unit, for receiving a session response message corresponding to the session request message identifier.

In another aspect, a system for a communication session for a visiting server device, the visiting server device includes: a sending unit, a session state unit, a receiving unit; the sending unit, the session state unit and the receiving unit are logically connected to each other;

the receiving unit, for receiving a session request message, the session request message includes: a session request message identifier, a first terminal session account, and the first terminal session account includes: a first terminal blockchain address or an address mapped one-in-one to the first terminal blockchain address, and a first terminal home server connection address;

the session state unit, for determining a first terminal blockchain address session state based on a transaction record between a visiting server blockchain address and the first terminal blockchain address; and the sending unit, for sending a session response based on the first terminal blockchain address session state and the session request message.

In another aspect, a non-transitory computer-readable storage medium stores a computer program, the computer program when executed by a processor implements any one of the method for the communication session.

The present application provides a method and system for a communication session. The following beneficial effects are provided:

The present application sends a session request message based on a first terminal blockchain address session state, where the session request message includes a session request message identifier, a first terminal session account, and the first terminal session account includes: the first terminal blockchain address or an address mapped one-in-one to the first terminal blockchain address, and a first terminal home server connection address, the first terminal blockchain address session state is determined based on a transaction record between a visiting server blockchain address and the first terminal blockchain address; receives a session response message corresponding to the session request message identifier. By means of the present application, the visiting server can provide connection communication service for any blockchain user, which improves the convenience of terminal communication.

BRIEF DESCRIPTION OF THE DRAWINGS

FIG. 7 is a flowchart of the first embodiment of the present application.

FIG. 8 is a flowchart of a device of the first embodiment of the present application.

DETAILED DESCRIPTION OF THE EMBODIMENTS

Figure 1:
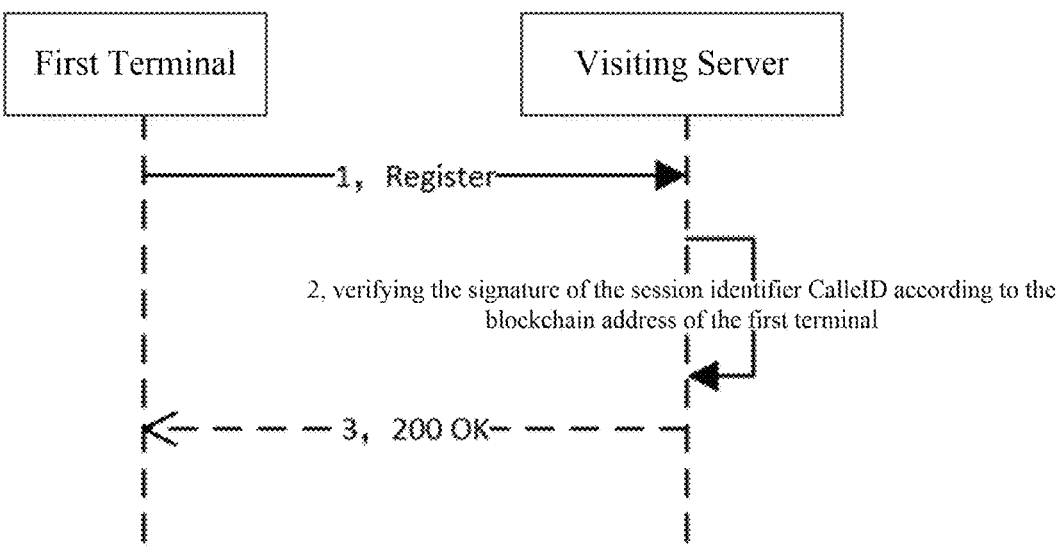
FIG. 1 is a flowchart of a second embodiment of the present application.

The present application is further described below in conjunction with the accompanying drawings and embodiments:

The blockchain technology of this embodiment comprises block DAG technology.

First Embodiment

First Embodiment of the present application discloses a method for a communication session, referring to FIG. 7, the method includes:

step S101, sending a session request message based on a first terminal blockchain address session state, the session request message includes: a session request message identifier, a first terminal session account, and the first terminal session account includes: the first terminal blockchain address or an address mapped one-in-one to the first terminal blockchain address, and a first terminal home server connection address, the first terminal blockchain address session state is determined based on a transaction record between a visiting server blockchain address and the first terminal blockchain address. The blockchain may be a public chain, a federated chain, or a private chain. The first terminal home server may be co-located with the visiting server. The first terminal home server connection address may be a domain name or an IPv4, an IPv6 address, etc., and the first terminal home server identifies a specific blockchain network corresponding to the first terminal blockchain address.

The session request message identifier may be a randomly generated sequence number that identifies the session and session signaling initiated by the first terminal to the visiting server.

If the first terminal session account includes an address mapped one-in-one to the first terminal blockchain address, when it needs to access to the blockchain network, the first terminal needs to translate the address mapped one-in-one to the first terminal blockchain address into the first terminal blockchain address, to make the name character set conform to various types of usage scenarios.

In one embodiment, the session request message further includes: a visiting server session account. The first terminal session account includes a visiting server blockchain address, a visiting server home server connection address. At this time, the first terminal can directly communicate instantly with the visiting server.

step S102, receiving a session response message corresponding to the session request message identifier. Typically, the session request message and the corresponding session response message are SIP communication protocol messages.

In this embodiment, the visiting server provides connection communication services for any blockchain user, and can determine the blockchain address session state based on the blockchain transaction records, and extends and integrates the user management of the existing SIP system, thereby realizing a flexible interconnection of all things.

In one embodiment, the session request message further includes: a session request message signature, and the session request message signature is a blockchain signature message generated based on the first terminal blockchain address and the session request message identifier.

In this embodiment, the blockchain signature technology is used to identify and verify the communication terminal to ensure the security of the session.

In one embodiment, the session state includes at least one of: a connectable state, a non-connectable state, a connectable duration, and a connectable type. The session state may also includes: unpaid, paid, unregistered, registered, etc.

In one embodiment, before sending the session request message based on the first terminal blockchain address session state, it includes: obtaining a first terminal blockchain address, a first terminal home server connection address; and determining a first terminal session account.

In one embodiment, before sending the session request message based on the first terminal blockchain address session state, it includes: obtaining the first terminal blockchain address, the first terminal home server connection address from a Blockchain-based ID (BID), and determining the first terminal session account. Referring to FIG. 8, the first terminal includes a BID card, a SIM card dual card for communication. The BID card is used in a blockchain communication system, and the SIM card is used in an ordinary cellular phone communication system. Unlike the SIM card, the BID can be customized by the user according to his or her needs.

In this embodiment, a blockchain identification card is embedded in the terminal device, and a general organization may issue a blockchain identification card for communication, thereby promoting diversity in the Internet of Things.

In one embodiment, the method further includes:
before sending the session request message based on the first terminal blockchain address session state, it further includes:
obtaining a second terminal blockchain address, a second terminal home server connection address; and
determining a second terminal session account.

In one embodiment, before sending the session request message based on the first terminal blockchain address session state, the method further includes: obtaining a second terminal blockchain address, a second terminal home server connection address from a payment file, and determining a second terminal session account.

In this embodiment, direct connection communication can be made against the issuer blockchain address of the payment file, thus enabling convenient initiation of instant communication at the time of payment.

In one embodiment, the first terminal blockchain address session state is determined based on a transaction record between the visiting server blockchain address and the first terminal blockchain address includes: determining the first terminal blockchain address session state based on a recent transaction record initiated by the visiting server blockchain address to the first terminal blockchain address.

In one embodiment, before sending the session request message based on the first terminal blockchain address session state, the method further includes: sending a session fee or session score from the first terminal blockchain address to the visiting server blockchain address.

Figure 2:
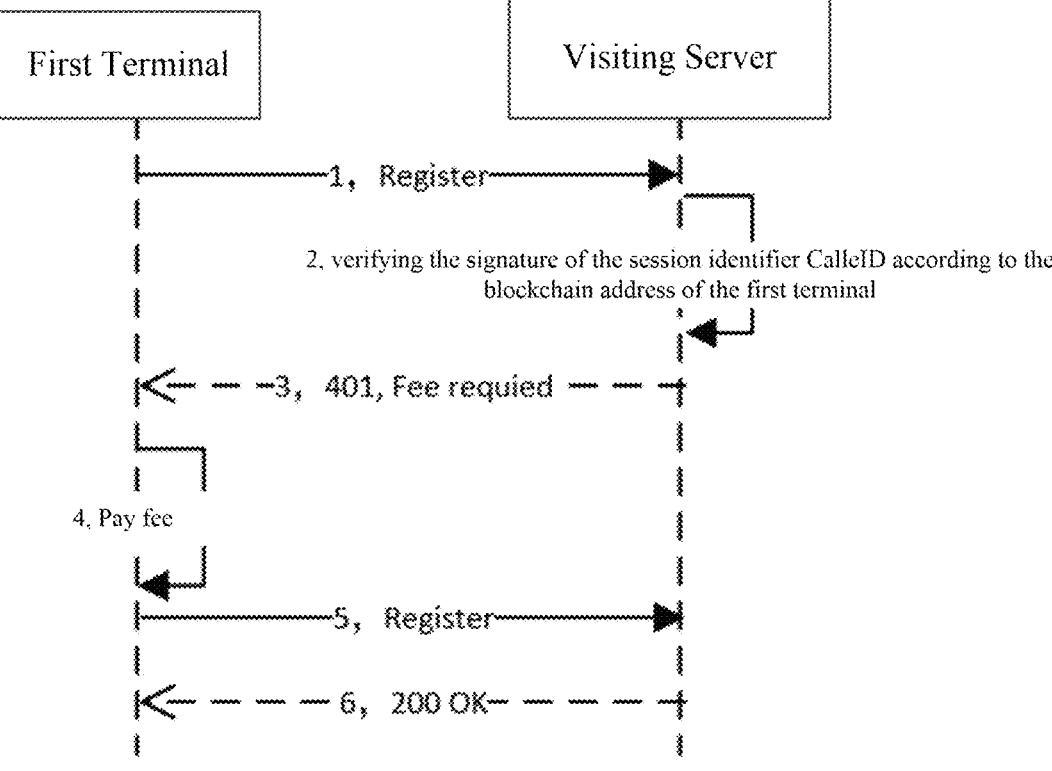
FIG. 2 is a flowchart of a first embodiment of the present application.

Referring to FIG. 2, this embodiment exemplifies the process as follows:

1. The first terminal sends register registration session information (CalleID) to the visiting server.
2. The visiting server verifies a signature of the session identifier CalleID according to the first terminal blockchain address.
3. The visiting server sends 401 Fee required session response to the first terminal.
4. The visiting server sends the session fee or session score from the first terminal blockchain address to the visiting server blockchain address.
5. The first terminal sends register registration session information (CalleID) to the visiting server.
6. The visiting server sending a 200 ok session response to the first terminal.

In one embodiment, the session request message includes one of: a SIP protocol register request message, a SIP protocol invite request message, and a SIP protocol message request message.

In one embodiment, before sending the session request message based on the first terminal blockchain address session state, the method further includes: determining the first terminal session account based on the first terminal blockchain email address.

In this embodiment, the blockchain email may be used for SIP communication to maximize compatibility with existing systems.

In one embodiment, before sending the session request message based on the first terminal blockchain address session state, the method further includes: determining the second terminal session account based on a second terminal blockchain email address.

In one embodiment, the visiting server blockchain address is: a preset address or a first terminal home server connection address or a second terminal home server connection address.

In one embodiment, the method of sending a session request message based on the first terminal blockchain address session state includes: determining a visiting server session account based on the visiting server blockchain email address, and sending a session request message to the visiting server session account based on the first terminal blockchain address session state.

In one embodiment, the method of sending a session request message based on the first terminal blockchain address session state includes: sending a session request message to a first terminal home server connection address based on the first terminal blockchain address session state.

In one embodiment, the first terminal home server connection address is a current level domain address or an IP address or an upper level domain address contained in the suffix of the first terminal blockchain email address.

Second Embodiment

Second Embodiment of the present application discloses a method for a communication session, the method includes:
step S201, receiving a session request message, the session request message includes: a session request message identifier, a first terminal session account, the first terminal session account includes: a first terminal blockchain address or an address mapped one-in-one to the first terminal blockchain address, and a first terminal home server connection address. A typical format of the first terminal session account is for example: sip: 567767@138.1.0.43:5061.
step S202, determining the first terminal blockchain address session state based on a transaction record between the visiting server blockchain address and the first terminal blockchain address. The visiting server may be a SIP proxy server, a redirect server, a registration server.

step S203, sending a session response based on the first terminal blockchain address session state and the session request message.

The above embodiment may occur in a visiting server, a second terminal, and an home server scenario.

In this embodiment, the visiting server provides connection communication services for any blockchain user, which can determine the blockchain address session state based on the blockchain transaction records, and extends and integrates the user management of the existing SIP system, thereby realizing flexible interconnection of all things.

In one embodiment, the method further includes:

the session request message further includes: a session request message signature, and the session request message signature is a blockchain signature message generated based on the first terminal blockchain address and the session request message identifier; and verifying whether the session request message signature is a blockchain signature of the first terminal blockchain address based on the first terminal blockchain address, the session request message identifier, and the session request message signature.

Referring to FIG. 1, this embodiment exemplifies the process as follows:

1. The first terminal sends register registration session information (CalleID) to the visiting server;

2. The visiting server verifies the signature of the session identifier CalleID according to the blockchain address of the first terminal;

3. The visiting server sends a 200 ok session response to the first terminal.

In one embodiment, the session state includes at least one of: a connectable state, a non-connectable state, a connectable duration, and a connectable type.

In one embodiment, the session request message includes: a SIP protocol register request message, a SIP protocol invite request message, and a SIP protocol message request message.

In one embodiment, the first terminal session account includes a first terminal blockchain email address.

In one embodiment, the determining the first terminal blockchain address session state based on the transaction record between the visiting server blockchain address and the first terminal blockchain address includes:

the first terminal home server connection address is a current level domain address or an IP address or an upper level domain address contained in a suffix of the first terminal blockchain email address;

in response to that the blockchain network corresponding to the first terminal home server connection address is supported, determining the first terminal blockchain address session state based on the transaction record between the visiting server blockchain address and the first terminal blockchain address;

in response to that the blockchain network corresponding to the first terminal home server connection address is not supported, forwarding the session request message to the first terminal home server connection address to enable the first terminal home server connection address to determine the first terminal blockchain address session state based on the transaction record between the first terminal home server blockchain address and the first terminal blockchain address, and receiving an home server session response sent by the first terminal home server connection address based on the first terminal blockchain address session state and the session request message.

In one embodiment, the blockchain network corresponding to the first terminal home server connection address includes: a blockchain network corresponding to the first terminal home server connection address and a blockchain network corresponding to the upper level domain name of the first terminal home server connection address.

In one embodiment, determining the first terminal blockchain address session state based on a transaction record between a visiting server blockchain address and the first terminal blockchain address includes:

determining the first terminal blockchain address session state based on the recent transaction record initiated by the visiting server blockchain address to the first terminal blockchain address.

In one embodiment, the determining the first terminal blockchain address session state based on the transaction record between the visiting server blockchain address and the first terminal blockchain address includes:

querying the transaction record between the visiting server blockchain address and the first terminal blockchain address, the transaction record marks the first terminal blockchain address session state as paid; and sending a specified amount of money from the visiting server blockchain address to the first terminal blockchain address to mark the first terminal blockchain address session state as connectable.

Figure 3:
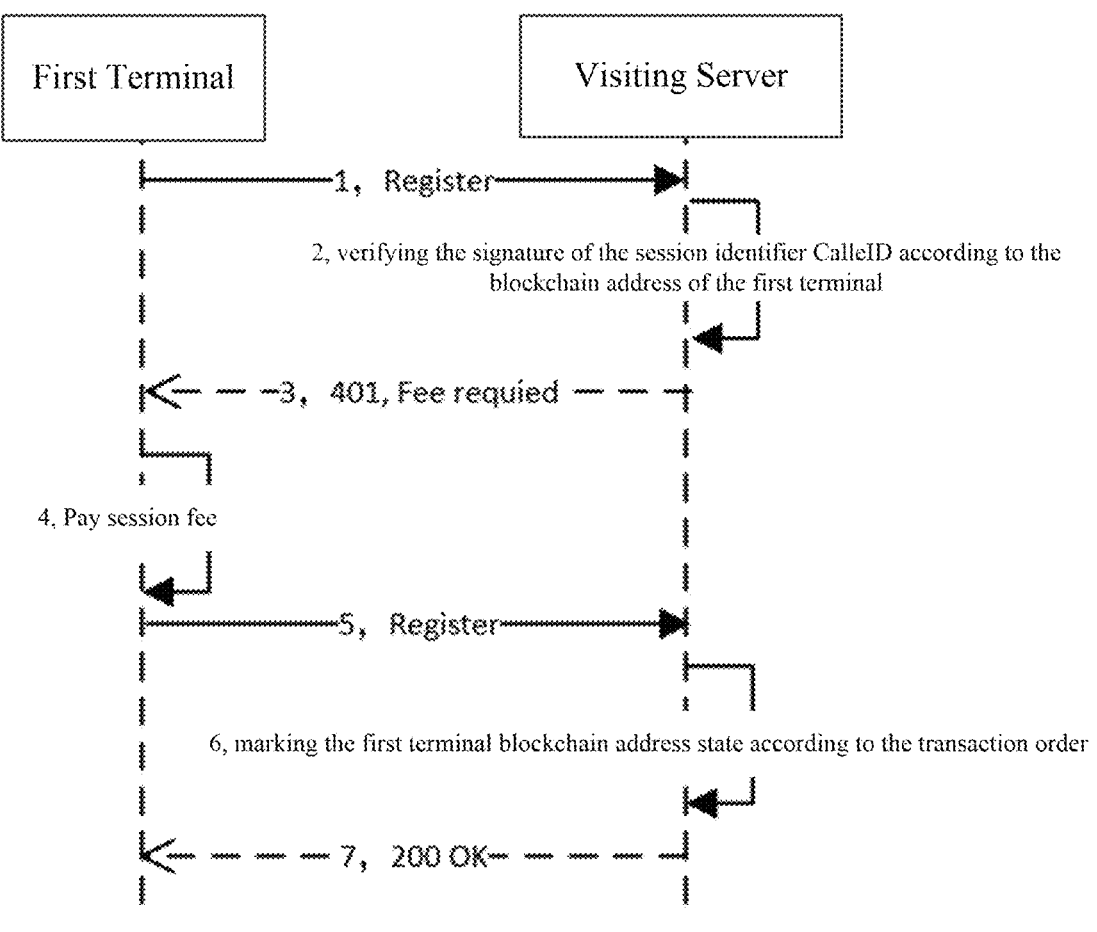
FIG. 3 is a flowchart of the second embodiment of the present application.

Referring to FIG. 3, this embodiment exemplifies the process as follows:

1. The first terminal sends register registration session information (CalleID) to the visiting server;

2. The visiting server verifies the signature of the session identifier CalleID according to the first terminal blockchain address;

3. The visiting server sends 401 Fee required session response to the first terminal;

4. Sending the session fee or session score from the first terminal blockchain address to the visiting server blockchain address;

5. The first terminal sends register registration session information (CalleID) to the visiting server;

6. The visiting server marks the first terminal blockchain address state according to the transaction order;

7. The visiting server sends a 200 ok session response to the first terminal.

In one embodiment, the the determining the first terminal blockchain address session state based on the transaction record between the visiting server blockchain address and the first terminal blockchain address includes:

querying the transaction record between the visiting server blockchain address and the first terminal blockchain address, the transaction record nestedly includes inscription information; and determining the first terminal blockchain address session state based on the inscription information.

In this embodiment, the transaction record may be self-contained with inscription information, and the use of the inscription information helps to establish an instant messaging connection in this embodiment.

In one embodiment, the method further includes:

the session request message includes: a SIP protocol register request message; and adding the first terminal to a user table.

In one embodiment, the method further includes:

the session request message includes a SIP protocol invite request message, and the session request message includes a second terminal session account; and forwarding the session request message to the second terminal session account.

In one embodiment, the second terminal session account includes a second terminal blockchain email address.

In one embodiment, the method further includes:

the session request message includes a second terminal session account;

determining a second terminal home server connection address, the second terminal home server connection address is a current level domain address or an IP address or an upper level domain address contained in a suffix of the second terminal blockchain email address; and forwarding the session request message to the second terminal home server connection address.

In one embodiment, the method further includes:

obtaining a list of forwarding addresses;

forwarding the session request message to the list of forwarding addresses one by one.

In this embodiment, when the existing user system of the visiting server does not support the blockchain email address, the existing SIP system will refuse the relevant service, and after using this embodiment, it can be forwarded to the first terminal home server, the second terminal home server, or a predetermined server for further processing, improving the compatibility of the system and further improving the convenience of the user.

With this embodiment, the user can access the WIFI network to the Internet and pay for communication anytime and anywhere. Specific examples are described as follows: supposing the first terminal blockchain email address is DXC123@ABC1.com, the first terminal blockchain address uses the ABC1 blockchain network, and the second terminal blockchain email address is DXC456@ABC2.com, and the second terminal blockchain address uses the ABC2 blockchain network.

Figure 4:
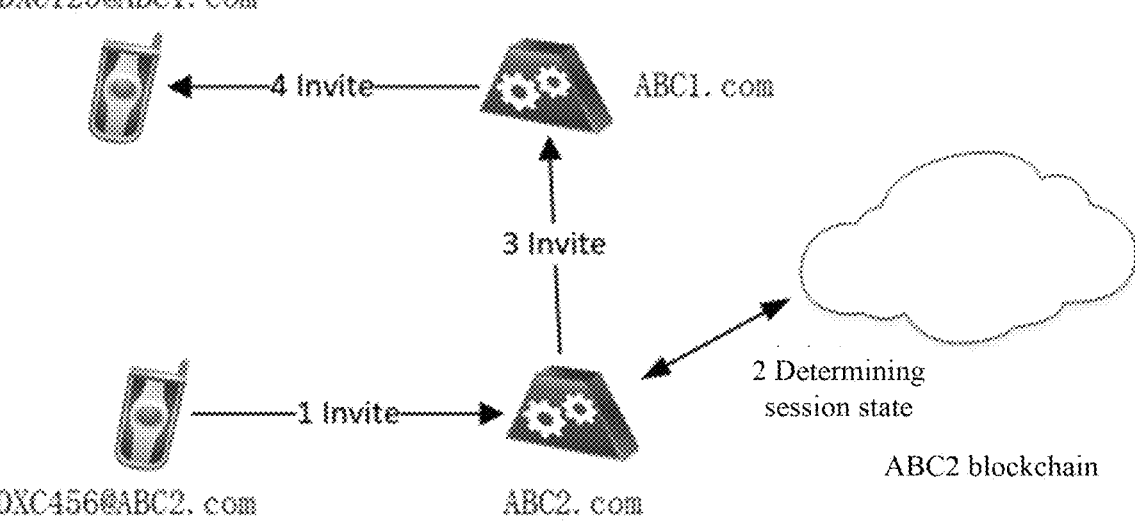
FIG. 4 is a flowchart of a standard connection of the second embodiment of the present application.

Alice comes to a coffee shop and prepares to access the Internet, firstly, she connects to the internal visiting server, which can be merged with the WIFI router as an integrated device or a separate standalone device. There are two routers combined with the visiting server, the domain name is set to ABC1.com, ABC2.com. There are three typical connection processes: a standard connection process, an intranet connection process, a cascade forwarding connection process. Examples are as follows:

Standard Connection Flow: (Refer to FIG. 4)

1. The second terminal DXC456@ABC2.com first sends Invite message to ABC2.com visiting server;
2. ABC2.com visits the server to query and determine the state of the second terminal blockchain address;
3. If the session state of the second terminal blockchain address allows the connection, the ABC2.com visiting server forwards the Invite message to the ABC1.com visiting server;
4. ABC1.com visiting server queries the user table, if it finds the first terminal DXC123@ABC1.com, and it forwards Invite message.

Figure 5:
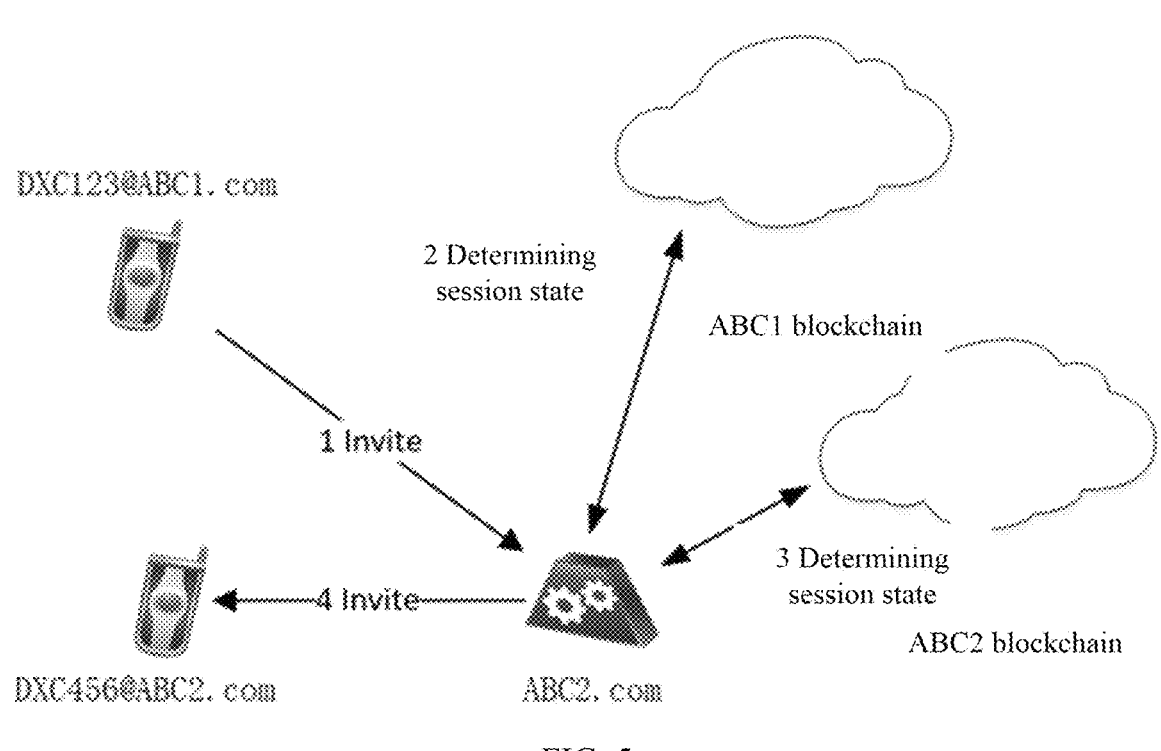
FIG. 5 is a flowchart of an intranet connection process of the second embodiment of the present application.

Intranet Connection Process: (Refer to FIG. 5)

1. The first terminal DXC123@ABC1.com first sends the invite message to ABC2.com visiting server;
3. ABC2.com visiting server queries to determine the first terminal blockchain address state;

2. ABC2.com visiting server queries to determine the second terminal blockchain address state as connectable;
3. ABC1.com visiting server forwards the invite message to the second terminal DXC456@ABC2.com.

Figure 6:
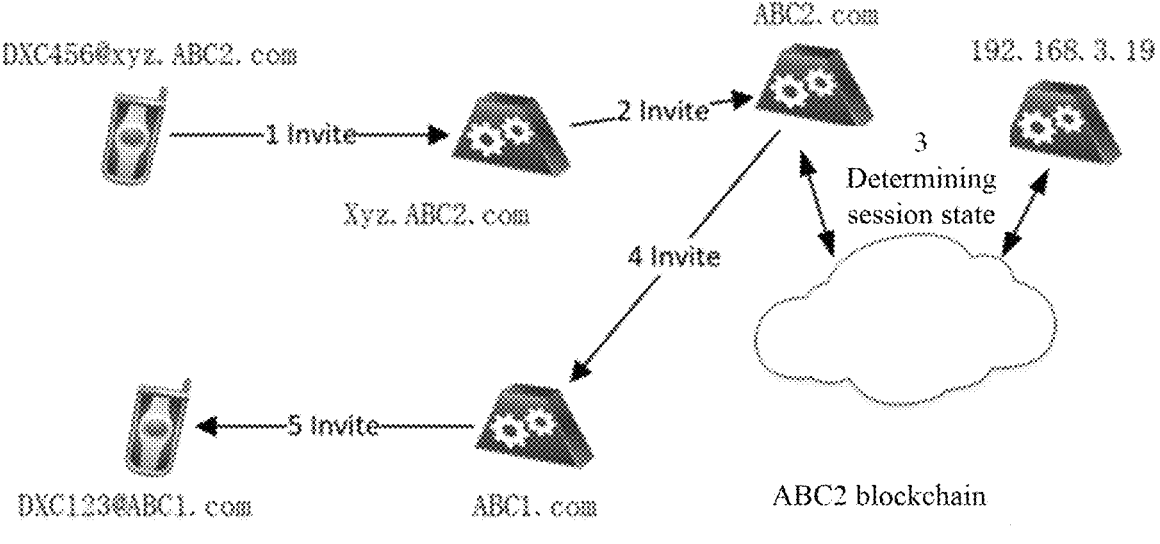
FIG. 6 is a flowchart of a cascade forwarding connection process of the second embodiment of the present application.

Cascade Forwarding Connection Process: (Refer to FIG. 6)

1. The second terminal DXC456@ABC2.com first sends the invite message to xyz.ABC2.com;
2. xyz.ABC2.com routes to the ABC2.com server;
3. ABC2.com visits the server to query and determine the second terminal blockchain address state;
4. ABC2.com visiting server forwards the invite message to ABC1.com visiting server;
5. The ABC1.com visiting server queries the user table, if it finds the first terminal DXC123@ABC1.com, and it forwards the invite message.

This embodiment invents a session communication mechanism based on blockchain authentication. Different heterogeneous networks can communicate with other users as long as they can access the visiting server.

Three Embodiment

Three Embodiment of the present application discloses a system for a communication session for a first terminal device, the first terminal device includes: a transmission unit, a receiving unit; the transmission unit and the receiving unit are logically connected to each other;

the transmission unit, for sending a session request message based on a first terminal blockchain address session state, the session request message includes: a session request message identifier, a first terminal session account, and the first terminal session account includes: the first terminal blockchain address or an address mapped one-in-one to the first terminal blockchain address, and a first terminal home server connection address, the first terminal blockchain address session state is determined based on a transaction record between a visiting server blockchain address and the first terminal blockchain address;

the receiving unit, for receiving a session response message corresponding to the session request message identifier.

The system for a communication session includes: a first terminal device, a visiting server device, a first terminal home server, a blockchain network, etc. The first terminal device is specifically the first terminal of the present embodiment, the visiting server device is specifically the visiting server of the present embodiment.

Fourth Embodiment

Fourth Embodiment of the present application discloses a system for a communication session for a visiting server unit, the visiting server unit includes a sending unit, a session state unit, a receiving unit; the sending unit, the session state unit and the receiving unit are logically connected to each other;

the receiving unit, for receiving a session request message, the session request message includes a session request message identifier and a first terminal session account, and the first terminal session account includes a first terminal blockchain address or an address mapped one-in-one to the first terminal blockchain address, and a first terminal home server connection address;

the session state unit, for determining a first terminal blockchain address session state based on a transaction record between a visiting server blockchain address and the first terminal blockchain address; and the sending unit, for sending a session response based on the first terminal blockchain address session state and the session request message.

Fifth Embodiment

Fifth Embodiment of the present application discloses a non-transitory computer-readable storage medium, on which a computer program is stored, when executed by a processor, implements the method for a communication session as described in any one of the foregoing. The storage medium may include a high-speed random access storage medium, and may also include a non-volatile storage medium, such as a hard disk, memory, a plug-in hard disk, a Smart medium Card (SMC), a Secure Digital (SD) card, a Flash Card, at least one disk storage medium member, a flash memory device, or other volatile solid state storage medium member, etc.

The present application sends a session request message based on a first terminal blockchain address session state, where the session request message includes a session request message identifier, a first terminal session account, and the first terminal session account includes: the first terminal blockchain address or an address mapped one-in-one to the first terminal blockchain address, and a first terminal home server connection address, the first terminal blockchain address session state is determined based on a transaction record between a visiting server blockchain address and the first terminal blockchain address; receives a session response message corresponding to the session request message identifier. By means of the present application, the visiting server can provide connection communication service for any blockchain user, which improves the convenience of terminal communication.

The technical personnel in the field to which it belongs can clearly understand that, for the convenience and conciseness of the description, the above-described unit is only illustrated by way of example with the division of each of the above-described functional modules, and in actual application, the above-described functions can be assigned to be accomplished by different functional modules according to the needs, i.e., the internal structure of the device is divided into different functional modules in order to accomplish all or part of the above-described functions. The specific working processes of the above-described systems, devices and units can be referred to the corresponding processes in the aforementioned method embodiments, which will not be repeated herein.

In the several embodiments provided in the present application, it should be understood that the disclosed systems, apparatuses and methods, may be realized in other ways. For example, the device embodiments described above are merely schematic, e.g., the division of the modules or units described is merely a logical functional division, and the actual implementation may be divided in other ways, e.g., multiple units or components may be combined or may be integrated into another system, or some features may be ignored, or not implemented. At another point, the coupling or direct coupling or communication connection between each other shown or discussed may be an indirect coupling or communication connection through some interface, device or unit, which may be electrical, mechanical or otherwise.

The units illustrated as separated components may or may not be physically separated, and components shown as units may or may not be physical units, i.e., they may be located in a single place or may also be distributed over a plurality of network units. Some or all of these units may be selected to fulfill the purpose of the embodiment scheme according to actual needs.

The integrated unit may be stored in a computer-readable storage medium if it is realized in the form of a software functional unit and sold or used as a separate product. Based on this understanding, the technical solution of the present application may be embodied essentially or in part as a contribution to the related art or in whole or in part in the form of a software product which is stored in a storage medium comprising a number of instructions for causing a computer device (which may be a personal computer, a server, or a network device, etc.) or a processor to perform the functions described in the various embodiments of the present application. processor) to perform all or part of the steps of the method described in various embodiments of the present application. The aforementioned storage medium include a USB flash drive, a mobile hard disk, a read-only memory (ROM), a random access memory (RAM), a magnetic disk, or a CD-ROM, and other medium that can store program code.

The foregoing is only a specific embodiment of the present application, but the scope of the present application is not limited thereto, and any skilled person familiar with the technical field of the present application can easily think of changes or substitutions within the technical scope of the present application, all of which shall be covered within the scope of the present application. Therefore, the scope of the present application shall be subject to the scope of the stated claims.

What is claimed is:

1. A method for a communication session, applied on a first terminal, comprising:

marking a first terminal blockchain address session state as connectable by initiating a recent transaction from a visiting server blockchain address to a first terminal blockchain address;

generating a session request message signature based on the first terminal blockchain address and a session request message identifier, wherein the session request message signature is a blockchain signature message;

sending a session request message to a visiting server directly based on the first terminal blockchain address session state;

wherein the session request message comprises: the session request message identifier, a first terminal session account, and the session request message signature;

wherein the first terminal session account comprises: the first terminal blockchain address or an address mapped one-in-one to the first terminal blockchain address, a first terminal attribution server connection address, the visiting server blockchain address, and a visiting server attribution server connection address;

wherein the first terminal attribution server connection address identifies a blockchain network corresponding to the first terminal blockchain address;

wherein the session request message identifier is a randomly generated sequence number that identifies a session and a session signaling initiated by the first terminal to the visiting server; and receiving a session response message corresponding to the session request message identifier directly from the visiting server.

2. The method for the communication session according to claim 1, wherein before sending the session request message based on the first terminal blockchain address session state, the method further comprises: determining the first terminal session account based on a first terminal blockchain email address.

3. The method for the communication session according to claim 1, wherein the first terminal blockchain address session state comprises at least one of a connectable state, a non-connectable state, a connectable duration, and a connectable type.

4. The method for the communication session according to claim 1, wherein before sending the session request message based on the first terminal blockchain address session state, the method further comprises: sending a session fee or a session credit from the first terminal blockchain address to the visiting server blockchain address.

5. The method for the communication session according to claim 1, wherein before sending the session request message based on the first terminal blockchain address session state, the method further comprises:

obtaining a second terminal blockchain address and a second terminal attribution server connection address from a payment file; and determining a second terminal session account, wherein the second terminal session account comprises the second terminal blockchain address and a second terminal home server connection address;

whereby the session request message causes the visiting server to forward it to the second terminal home server connection address determined based on the second terminal session account.

6. The method for the communication session according to claim 1, wherein before sending the session request message based on the first terminal blockchain address session state, the method further comprises:

obtaining the first terminal blockchain address and the first terminal attribution server connection address from a blockchain identification card; and determining the first terminal session account.

7. A non-transitory computer-readable storage medium, on which a computer program is stored, wherein the computer program when executed by a processor implements the method for the communication session as claimed in claim 1.

8. The method for the communication session according to claim 1, wherein the session request message and the session response message are SIP communication protocol messages, and/or the visiting server is a SIP proxy server.

9. A method for a communication session, applied on a visiting server, wherein the method comprises:

sending a specified amount of money from a visiting server blockchain address to a first terminal blockchain address for marking a first terminal blockchain address session state as connectable;

receiving a session request message directly from a first terminal, wherein the session request message comprises a session request message identifier, and a first terminal session account;

wherein the first terminal session account comprises: the first terminal blockchain address or an address mapped one-in-one to the first terminal blockchain address, a first terminal attribution server connection address, a visiting server blockchain address, and a visiting server attribution server connection address;

wherein the first terminal attribution server connection address identifies a blockchain network corresponding to the first terminal blockchain address;

wherein the session request message identifier is a randomly generated sequence number that identifies a session and a session signaling initiated by the first terminal to the visiting server;

wherein the session request message further comprises: a session request message signature, and the session request message signature is a blockchain signature message generated based on the first terminal blockchain address and the session request message identifier;

verifying whether the session request message signature is a blockchain signature of the first terminal blockchain address based on the first terminal blockchain address and the session request message identifier;

in response to successful verification of the session request message signature, determining the first terminal blockchain address session state based on a transaction record between the visiting server blockchain address and the first terminal blockchain address; and sending a session response message directly to the first terminal corresponding to the session request message identifier based on the first terminal blockchain address session state and the session request message.

10. The method for the communication session according to claim 9, wherein the first terminal session account comprises a first terminal blockchain email address;

the first terminal attribution server connection address is a current level domain name address or an IP address or an upper level domain name address contained in a suffix of the first terminal blockchain email address;

wherein the determining the first terminal blockchain address session state based on the transaction record between the visiting server blockchain address and the first terminal blockchain address comprises:

in response to that the blockchain network corresponding to the first terminal attribution server connection address is supported, determining the first terminal blockchain address session state based on the transaction record between the visiting server blockchain address and the first terminal blockchain address;

in response to that the blockchain network corresponding to the first terminal attribution server connection address is not supported, forwarding the session request message to the first terminal attribution server connection address to enable the first terminal attribution server connection address to determine the first terminal blockchain address session state based on the transaction record between the first terminal attribution server blockchain address and the first terminal blockchain address; and receiving an attribution server session response sent by the first terminal attribution server connection address based on the first terminal blockchain address session state and the session request message.

11. The method for the communication session according to claim 9, wherein the determining the first terminal blockchain address session state based on the transaction record between the visiting server blockchain address and the first terminal blockchain address comprises:

querying the transaction record between the visiting server blockchain address and the first terminal blockchain address, wherein the transaction record marks the first terminal blockchain address session state as paid.

12. The method for the communication session according to claim 9, wherein the determining the first terminal blockchain address session state based on the transaction record between the visiting server blockchain address and the first terminal blockchain address comprises:

querying the transaction record between the visiting server blockchain address and the first terminal blockchain address, wherein the transaction record nestedly comprises inscription information; and determining the first terminal blockchain address session state based on the inscription information.

13. The method for the communication session according to claim 9, wherein the session request message comprises a second terminal session account;

the second terminal session account comprises a second terminal blockchain address and a second terminal home server connection address;

the method further comprises:

determining a second terminal attribution server connection address, wherein the second terminal attribution server connection address is a current level domain name address or an IP address or an upper level domain name address contained in a suffix of the second terminal blockchain email address; and forwarding the session request message to the second terminal attribution server connection address.

14. The method for the communication session according to claim 9, wherein the session request message comprises: a SIP protocol REGISTER request message;

wherein the method further comprises:

adding the first terminal to a user table.

15. The method for the communication session according to claim 9, wherein the session request message comprises a SIP protocol INVITE request message, and the session request message comprises a second terminal session account;

wherein the method further comprises:

querying and determining a session state of a second terminal blockchain address; and If the session state of the second terminal blockchain address allows the connection, forwarding the session request message to the second terminal session account.

16. The method for the communication session according to claim 9, wherein the session request message and the session response message are SIP communication protocol messages, and/or the visiting server is a SIP proxy server.

\* \* \* \* \*